Nov. 18, 1941.    G. E. LOFGREN    2,263,180
CLOSURE MEMBER LOCKING MEANS
Filed Dec. 10, 1937
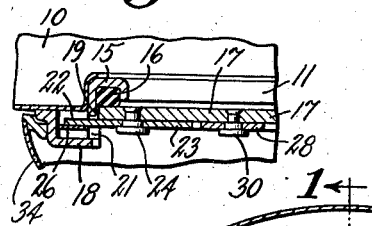
Fig.3.
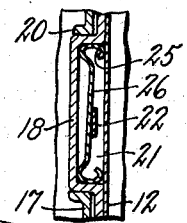
Fig.4.
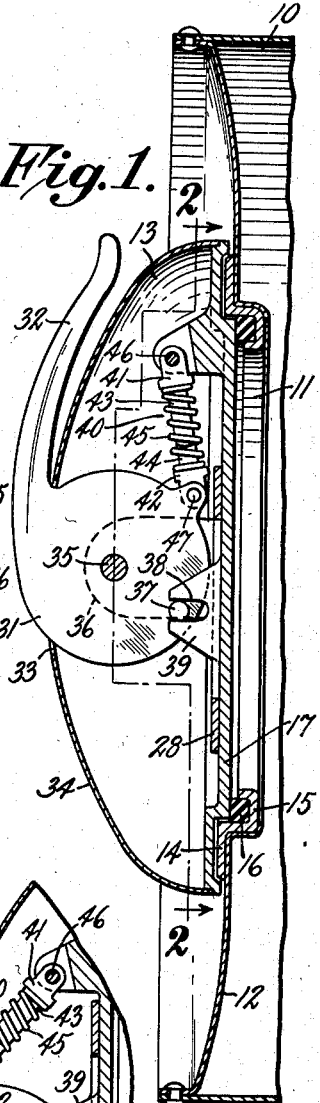
Fig.1.
Fig.2.
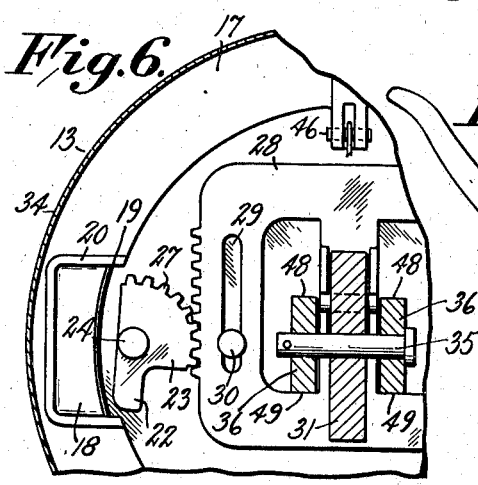
Fig.6.
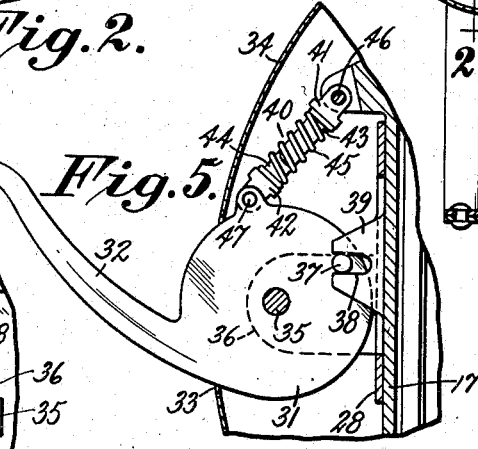
Fig.5.
INVENTOR.
Gustaf Einar Lofgren
BY Arthur G. Prangley
His ATTORNEY.

Patented Nov. 18, 1941

2,263,180

UNITED STATES PATENT OFFICE 2,263,180

CLOSURE MEMBER LOCKING MEANS

Gustaf Einar Lofgren, Riverside, Conn., assignor to Electrolux Corporation, Dover, Del., a corporation of Delaware Application December 10, 1937, Serial No. 179,068

8 Claims. (Cl. 292—51)

This application is a continuation in part of my co-pending application, Serial No. 87,125 filed June 25, 1936, now Letters Patent No. 2,112,372, dated March 29, 1938.

My invention relates to closure members and more particularly to means for securing a closure member in place.

An object of my invention is to provide a new and improved means for removably securing a closure member in place. In accordance with my invention, the closure member may be removed by a simple natural movement of a single operating handle. The closure member is moved in the same general direction for removing or replacing it as the handle is moved for releasing or closing, respectively, the securing means.

Another object of my invention is to provide a toggle mechanism for holding the securing means in open or closed position depending upon whether the operating handle is in the open or closed position.

A still further object of my invention is to provide a locking mechanism for a closure member which will accurately position the closure member and securely hold it in position.

What I consider to be novel and my invention may be better understood by reference to the following specification and appended claims when considered in connection with the accompanying drawing, in which:

Fig. 1 is a side-sectional view of a casing with my improved closure member, taken along the lines 1—1 of Fig. 2;

Fig. 2 is an end sectional view of the closure member with detents in engagement with bosses of the casing, taken on the line 2—2 of Fig. 1;

Fig. 3 is a sectional view, taken on line 3—3 of Fig. 2;

Fig. 4 is a sectional view, taken on the line 4—4 of Fig. 2;

Fig. 5 is a sectional view similar to Fig. 1 except with the handle in the open position; and Fig. 6 is a sectional view similar to Fig. 2 except with the detent in retracted position.

Referring particularly to Fig. 1, a casing 10 has an end opening 11 in a vertical side or end wall 12 which is covered by a removable closure member 13. A ring 14 is mounted in opening 11 with an inwardly extending flange 15 carrying a compressible gasket 16. A back plate 17 of closure member 13 covers ring 14 and engages the gasket 16.

For positioning the closure member 13 on the opening 11, ring 14 is provided with forwardly extending bosses 18 which enter boss receiving openings 19 formed by inwardly extending flanges 20 of the back plate 17. The bosses 18 are formed integrally with the ring 14 and are located at opposite sides of the opening 11. When the closure member 13 is positioned on the ring 14, the top horizontal portions of flanges 20 rest in engagement with the top surfaces of bosses 18. Bosses 18 are provided with inwardly opening pockets 21 which are adapted to receive detents 22 carried by pivoted fingers 23 for securing the closure member 13 to the casing 10. Fingers 23 are pivotally secured to the back plate 17 on a plane surface by means of pivot pins 24. Located within the pocket 21 of boss 18 is a spring 25 for resilient engagement with detent 22 having a straight portion 26 which is inclined to the plane of movement of detent 22, as best indicated in Fig. 4. The plane of movement of detent 22 is determined by the large plane surface of back plate 17 upon which it rests. Engagement between the detent 22 and the straight portion 26 of spring 25 produces a force tending to compress the gasket 16 and position the closure member 13, as will be pointed out below.

Fingers 23 are provided with pinion teeth 27 which are engaged by a reciprocal rack bar 28. Rack bar 28 is provided with slots 29 which are engaged by headed pins 30 secured to the back plate 17. When the rack bar 28 is moved upwardly from the position indicated in Fig. 2, the fingers 23 are rotated from the substantially horizontal position approximately 90 degrees to a substantially vertical position as indicated in Fig. 6. As the fingers 23 are rotated, the detents 22 are moved out from engagement with the bosses 18 releasing the securing means of closure member 13 from engagement with the casing 10. When the rack 28 is moved downwardly from the position indicated in Fig. 6, the fingers 23 are rotated from the substantially vertical position to the substantially horizontal position with the detents 22 extending into the pockets 21 of bosses 18 in engagement with spring 25.

The rack and pinion securing mechanism with the fingers 23 pivoted closely adjacent to the outer edge of the closure member 13 with a pinion of short radius makes it possible to obtain a large amplitude of movement of the fingers 23 with a relatively small reciprocal movement of the rack 28. Also this makes possible a short detent 22 which may be accurately positioned on the plane surface of back plate 17 and will not bend readily producing a misalignment with the detent receiving openings or pockets 21 of bosses 18.

For operating the securing mechanism, a turn block 31 is provided with a handle 32 extending through an opening 33 provided in a cover 34. Turn block 31 is pivoted on back plate 17 for movement in a plane at right angles to rack 28 and on an axis perpendicular to the axis of rotation of fingers 23 by means of a pivot pin 35 carried in lugs 36. Turn block 31 carries a pin 37 which engages in slots 38 of ears 39 provided on the rack bar 28. The pin and slot connection between the turn block 31 and the rack 28 converts the rotary motion of the turn block to reciprocal motion of the rack bar 28.

For holding the turn block 31 in either of its two extreme positions, toggle mechanism 40 is provided and connected between the turn block 31 and the back plate 17. Toggle mechanism 40 consists of a link 41 pivotally connected to back plate 17 and a link 42 carried by turn block 31. Link 41 has a tongue 43 which overlies a corresponding tongue 44 of link 42. Tongues 43 and 44 are jointly surrounded by a helical spring 45. Link 41 is pivotally connected to back plate 17 by pin 46 and link 42 is pivotally connected to turn block 31 by a pin 47. When the turn block 31 is in the position indicated in Fig. 1, which may be termed the "closed position," the spring 45 produces a force tending to move the links 42 and 41 away from each other and to rotate the turn block 31 in a clockwise direction. Through the pin and slot connection between the turn block 31 and the rack bar 28 this force holds the rack bar in engagement with stop shoulders 48 provided on the lugs 36.

When the turn block 31 is moved in a counter clockwise direction by means of the handle 32 from the position as indicated in Fig. 1, the spring 45 is compressed until the toggle mechanism 40 passes through dead center, that is the position when the pins 46 and 47 and 35 are in a straight line. Upon continued movement in a clockwise direction past dead center, the spring 45 produces a force in a direction to assist in rotating the turn block 31 in a counter clockwise direction. When the turn block 31 has reached the position indicated in Fig. 6, which is termed the "open position," further movement is stopped by engagement of the rack bar 28 with stop shoulders 49 of lugs 36.

When the turn block 31 and handle 32 are in the closed position of Fig. 1, the rack bar 28 and fingers 23 are in the position indicated in Fig. 2 with the detents extending into the pockets 21 of bosses 18 and engaging the springs 25. When the turn block 31 and handle 32 are in the position indicated in Fig. 5, the open position, the rack 28 and fingers 23 are in the position indicated in Fig. 6. In this position detent 22 is retracted from engagement with the boss 18.

Assuming the closure member 13 to be secured in position covering the opening 11 of casing 10, as indicated in Fig. 1, it may be removed as follows:

The handle 32 is grasped and moved in a direction away from the back plate 17 and the cover 34 rotating the turn block 31 in a counter clockwise direction against the bias of spring 45 of toggle mechanism 40. As the turn block 31 is rotated in this direction, the pin 37 carried thereby moves the rack 28 upwardly. Movement of the rack bar 28 in this direction rotates the fingers 23, moving the detents 22 downwardly and out from the pockets 21 of the bosses 18. When the detents 22 are entirely disengaged from the bosses 18 and movement of the rack 28 is stopped by its engagement with stop shoulders 49, further movement of the hand grasping the handle 32 in the same general direction in which it has been moved to release the securing means will remove the closure member 13 from the casing 10. The turn block 31 and handle 32 are held in the open position by the toggle mechanism 40 which maintains the detents 22 in a substantially vertical position. This prevents the fingers 23 from moving to an intermediate position with the detents 22 extending outwardly where they might be damaged upon the placing of the closure member 13 on the casing 10.

When it is desired to replace the closure member 13 on the casing 10, the procedure is as follows:

The handle 32 which is in the open position as indicated in Fig. 5, or if not in this position must be moved to this position, is grasped by the hand. The closure member 13 is then moved toward and positioned over the opening 11 with the bosses 18 entering the boss receiving openings 20. The closure member 13 is allowed to rest with the tops of flanges 20 on the top surfaces of bosses 18. The force of gravity resulting from the weight of the closure member 13 will hold it in this position on the bosses 18. Further movement of the hand grasping the handle 32 in the general direction in which it is moved in placing the closure member 13 over the opening 11 will move the handle 32 toward the cover 34 rotating the turn block 31 in a clockwise direction against the bias of the spring 45 of toggle mechanism 40. Rotation of turn block 31 in a clockwise direction will cause the pin 37 to move the rack bar 28 downwardly. The fingers 23 will be rotated with the detents 22 entering the bosses 18 and engaging the spring 25. As the detent 22 enters the boss 18, it moves upwardly in engagement with the inclined portion 26 of spring 25. Since this portion 26 is inclined inwardly toward the ring 14 from the bottom of boss 18, the detent 22 in moving upwardly displaces the spring 25 outwardly from the ring 14. This produces a force with one component normal to the plane of movement of detent 22 in a direction to compress the gasket 16 and so provide a tight seal between the opening 11 and the closure member 13. A second component of this force is in the plane of movement of the detent 22 and in a downward direction. This second component of force is in the same direction as the force of gravity holding the closure member 13 with the top flanges 20 resting on the top surfaces of bosses 18. In this manner an easy and accurate positioning of the closure member 13 on the opening 11 is assured.

When the handle 32 is moved to the fully closed position the toggle mechanism 40 holds the rack 28 against the stop shoulders 48 and so maintains the detents 22 in closure engaging position. The force produced by the spring 45 of toggle mechanism 40 overcomes the force of springs 25 tending to move the detents 22 downwardly out of the bosses 18. The positioning of the closure member 13 on the opening 11 is determined by bosses 18 and the springs 25 and the closure member 13 is locked thereby by the toggle mechanism 40.

What I claim is:

1. A locking mechanism for a closure member including a plate having boss receiving openings, bosses entering said openings, pivoted fingers secured to said plate having detents adapted to enter side openings in said bosses, pinion teeth on said fingers, a sliding rack engaging said pinion teeth for rotating said fingers, and a handle pivotally secured to said plate and engaging said rack for moving said detents into and out of engagement with said bosses.

2. A locking mechanism for a closure member including a plate, fingers pivotally secured to said plate having detents, pinion teeth carried by said fingers, a sliding rack engaging said pinion teeth, a turn block having a handle pivotally secured to said plate, a pin carried by said turn block engaging said rack, a toggle mechanism connected between said turn block and said plate, and stop shoulders engaged by said rack for limiting the movement of the rack in both directions, said toggle mechanism holding said detents in the open or closed position depending upon the position of said handle.

3. A locking mechanism for a closure member including a plate having boss receiving openings, bosses entering said openings, fingers pivotally secured to said plate having detents adapted to move upwardly into closure engaging position with said bosses and downwardly to retracted position, mechanism for rotating said fingers, and springs located in said bosses having surfaces inclined inwardly to the top of the bosses, said fingers engaging said inclined surfaces of said springs upon movement toward closure engaging position and adapted to displace said springs outwardly, whereby a force is produced holding said closure member with the top of the boss receiving openings of said plate engaging the top surfaces of said bosses.

4. A locking mechanism for a closure member including a plate, a plurality of detents pivotally mounted on said plate and formed with pinion teeth, a rack member slidably mounted on said closure member engaging the pinion teeth of said detents, a handle pivotally mounted on said closure member, and a pin and slot connection between said handle and said rack member for converting rotary motion in the former to straight line motion in the latter.

5. A locking mechanism for a closure member including a plate having boss receiving openings, bosses entering said openings, fingers pivotally secured adjacent the outer edge of said plate and having detents engaging said bosses, pinion teeth carried by said fingers, a slidable rack engaging said pinion teeth adapted upon movement in one direction to move said detents downwardly from engagement with said bosses and upon movement in the opposite direction to move said detents upwardly into engagement with said bosses, springs located in said bosses having surfaces inclined inwardly from the bottom to the top of said bosses producing a force upon engagement by said detents holding said closure member in position resting on the tops of said bosses, a handle pivotally secured to said plate and engaging said rack, and a toggle mechanism connected between said handle and said plate for holding said detents in closure engaging position or in retracted position depending upon the position of said handle.

6. A locking mechanism for a closure member including a plate having boss receiving openings, bosses entering said openings having pockets opening toward the center of the plate, fingers pivotally mounted on said plate adjacent the edges thereof, said fingers including detents adapted to engage said bosses, pinion teeth carried by said fingers, a sliding rack engaging said pinion teeth, and a handle engaging said rack for moving said detents into and out of engagement with said bosses.

7. A locking mechanism for a closure member including a plate having boss receiving openings, bosses entering said openings, said plate resting in a vertical plane on said bosses, fingers pivotally secured to said plate having detents adapted to move upwardly into a closure engaging position with said bosses, means for rotating said fingers, and means located in said bosses having surfaces inclined inwardly to the tops of the bosses, said fingers engaging said inclined surfaces upon movement toward a closure engaging position and adapted to produce a force in a direction to hold said plate in engagement with the top surfaces of said bosses.

8. A locking mechanism for a closure member including a plate having boss receiving openings, bosses entering said openings, fingers pivotally mounted on said plate adjacent the edges thereof, said fingers having detents adapted to engage said bosses, pinion teeth carried by said fingers, a sliding rack engaging said pinion teeth, and means to move said rack in one direction to move said detents into engagement with said bosses and in the opposite direction to retract said detents from said bosses.

GUSTAF EINAR LOFGREN.

CERTIFICATE OF CORRECTION.

Patent No. 2,263,180.   November 18, 1941.

GUSTAF EINAR LOFGREN.

It is hereby certified that error appears in the printed specification of the above numbered patent requiring correction as follows: Page 3, first column, line 39, claim 4, for "closure member" read --plate--; and that the said Letters Patent should be read with this correction therein that the same may conform to the record of the case in the Patent Office.

Signed and sealed this 3rd day of March, A. D. 1942.

(Seal)

Henry Van Arsdale,
Acting Commissioner of Patents.